United States Patent [19]

Aoki et al.

[11] Patent Number: 5,510,936
[45] Date of Patent: Apr. 23, 1996

[54] APPARATUS FOR ADJUSTING LENS POSITION

[75] Inventors: Nobuaki Aoki; Shinsuke Kohmoto; Zenichi Okura, all of Tokyo, Japan

[73] Assignee: Asahi Kogaku Kogyo Kabushiki Kaisha, Tokyo, Japan

[21] Appl. No.: 327,596

[22] Filed: Oct. 24, 1994

[30] Foreign Application Priority Data

Oct. 25, 1993 [JP] Japan .................................. 5-266682

[51] Int. Cl.⁶ ........................................................ G02B 7/02
[52] U.S. Cl. ........................................... 359/822; 359/823
[58] Field of Search ........................... 359/822, 808, 359/813, 819, 699, 701, 703, 704, 829, 694, 696, 823, 827, 825, 700, 829, 830, 811; 354/195.1

[56] References Cited

U.S. PATENT DOCUMENTS

| | | | |
|---|---|---|---|
| 2,894,430 | 7/1959 | Schugh | 359/830 |
| 4,934,789 | 6/1990 | Lemke | 359/823 |
| 4,944,030 | 7/1990 | Haraguchi et al. | |
| 4,974,949 | 12/1990 | Tanaka | |
| 5,144,493 | 9/1992 | Nomura | |
| 5,210,644 | 5/1993 | Nomura | |
| 5,225,938 | 7/1993 | Nomura | |
| 5,245,476 | 9/1993 | Shono | |
| 5,327,184 | 7/1994 | Nomura et al. | |
| 5,349,475 | 9/1994 | Nomura | 359/694 |

*Primary Examiner*—Georgia Y. Epps
*Assistant Examiner*—Ricky Mack
*Attorney, Agent, or Firm*—Greenblum & Bernstein

[57] ABSTRACT

An apparatus for adjusting the axial position of a lens includes a lens frame which holds the lens, and a lens frame holder which holds the lens frame to allow movement in the optical axis direction. A plurality of split screw engaging portions are provided between the lens frame and the lens frame holder, so that the lens frame and the lens frame holder are capable of being fitted together without rotating and are screw engagable with the split screw engaging portions.

13 Claims, 6 Drawing Sheets

APPARATUS FOR ADJUSTING LENS POSITION

BACKGROUND OF THE INVENTION

1. Field of the Invention

The present invention relates to an apparatus for adjusting an axial position of a lens, such as a photographing lens in a camera.

2. Description of the Related Art

Figure 8:
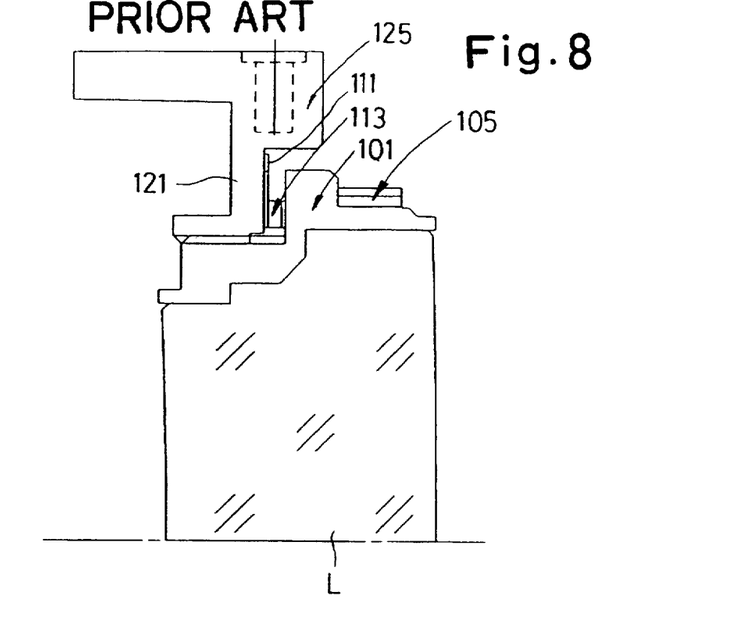
FIG. 8 is a sectional view of a main part of a known lens adjusting mechanism; and, FIG. 9 is an exploded isometric view of a known lens adjusting mechanism shown in FIG. 8.
Figure 9:
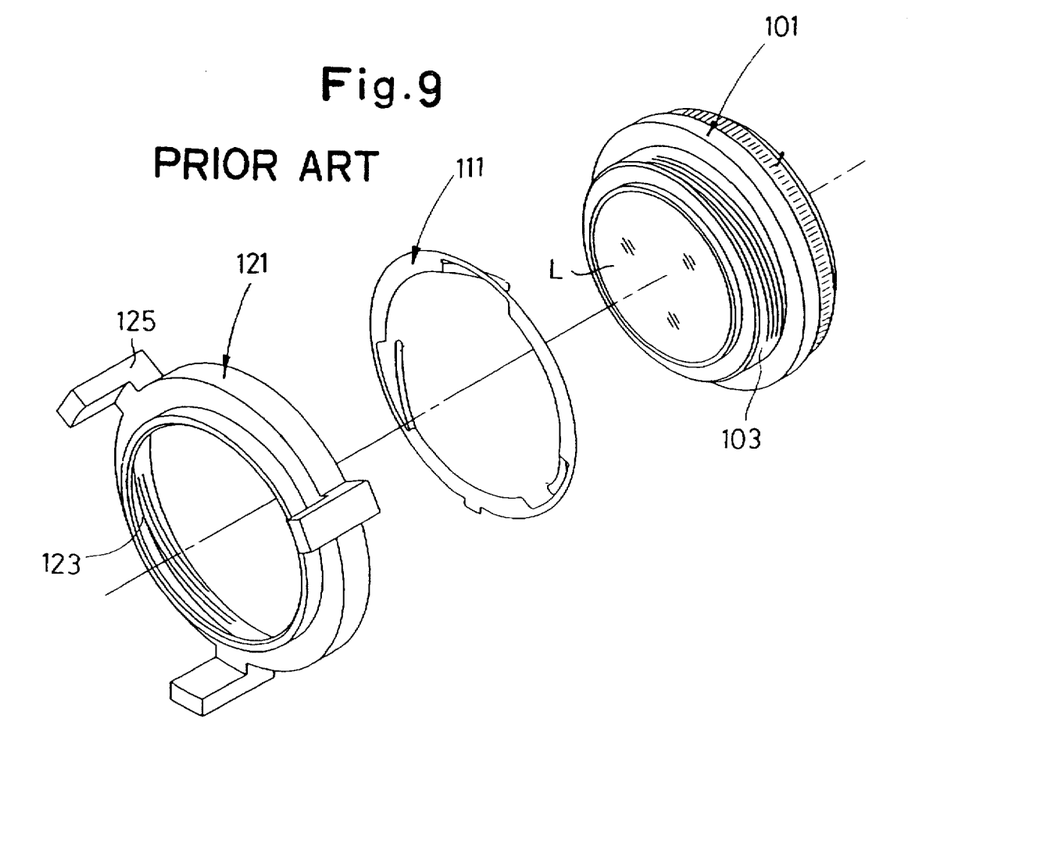

In a conventional camera, for example to achieve a zooming adjustment, an axial position of a photographing lens is adjusted by a position adjusting mechanism provided on a lens holder. It is known for a zooming type camera lens, that the image position formed at the telephoto position should be coincident with image position formed at the wide angle position. Unfortunately, during initial assembly of such a camera lens, these image positions are not coincident and therefore some adjustment (zooming adjustment) of the lens elements is necessary. For instance, a lens frame 101 which holds a lens L is connected to a lens frame holder 121 which supports the lens frame 101 through helicoids 103 and 123 provided on the lens frame 101 and the lens frame holder 121, respectively, as shown in FIGS. 8 and 9. There is a lens keeping ring 111 between the lens frame 101 and the lens frame holder 121 to bias the lens frame 101 and the lens frame holder 121 in an axial direction.

The helicoid 103 or 123 is moved in a direction of the optical axis to approach to the helicoid 123 or 103 and is then rotated to screw-engage the helicoid 103 or 123 with the other helicoid 123 or 103. However, the helicoids 103 and 123, in the conventional position adjusting mechanism, are continuously positioned around the inside of the lens frame holder and the outside of the lens frame. Accordingly, the amount of screw-engagement between the helicoids 103 and 123 gradually increases in the optical axis direction as the relative angular displacement thereof increases. Accordingly, it is necessary to relatively rotate the helicoid 103 or 123 by at least one-half turn in order to provide a sufficient amount of screw-engagement. Otherwise, an undesirable accidental displacement or inclination could take place between the lens frame 101 and the lens frame holder 121 due to the insufficient amount of screw-engagement between the helicoids. To this end, in a conventional lens adjusting mechanism, the lens frame 101 must be rotated by more than 90° with respect to the lens frame holder 121 after the screw-engagement begins.

However, if there is a projection on the lens frame 101, it is difficult to rotate the lens frame by a relatively large angular displacement due to an interference between the projection and another element. Alternatively it is necessary to provide enough space to permit the projection to move without interference.

SUMMARY OF THE INVENTION

It is an object of the present invention to provide a lens adjusting apparatus in which a sufficient amount of engagement can be obtained through a small angular rotation of the lens frame.

To achieve the object mentioned above, according to the present invention, an apparatus is provided for adjusting an axial position of a lens. The apparatus includes a cylindrical lens frame which holds the lens; a cylindrical lens frame holder which holds the lens frame; and a screw connecting mechanism which includes a plurality of segments of screw engaging portions provided on both the lens frame and the lens frame holder. The segmented screw engaging portions are split in a circumferential direction thereof, so that the lens frame and the lens holder are capable of being fitted together without a relative rotation and thereafter are screw engagable with the split screw engaging portions when the lens frame is rotated relative to the lens frame holder.

According to another aspect of the present invention, an apparatus is provided for adjusting an axial position of a lens. The apparatus includes a cylindrical inner frame which holds the lens; a plurality of outer projections provided on an outer periphery of the inner frame; a cylindrical outer frame holder and a plurality of inner projections and inner recesses formed between the inner projections, which are provided in an inner periphery of the inner frame holder. The outer projections of the inner frame are capable of being inserted into the inner recesses of the outer frame holder without a relative rotation between the inner frame and the outer frame holder. At least one male projection is provided on an outer projection of the inner frame and one female groove is provided on an inner projection of the outer frame holder. The male projection and the female groove are capable of being engaged by a relative rotation between the inner frame and the outer frame holder after the inner frame is inserted into the outer frame holder.

The present disclosure relates to subject matter contained in Japanese patent application No. 5-266682 (filed on Oct. 25, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
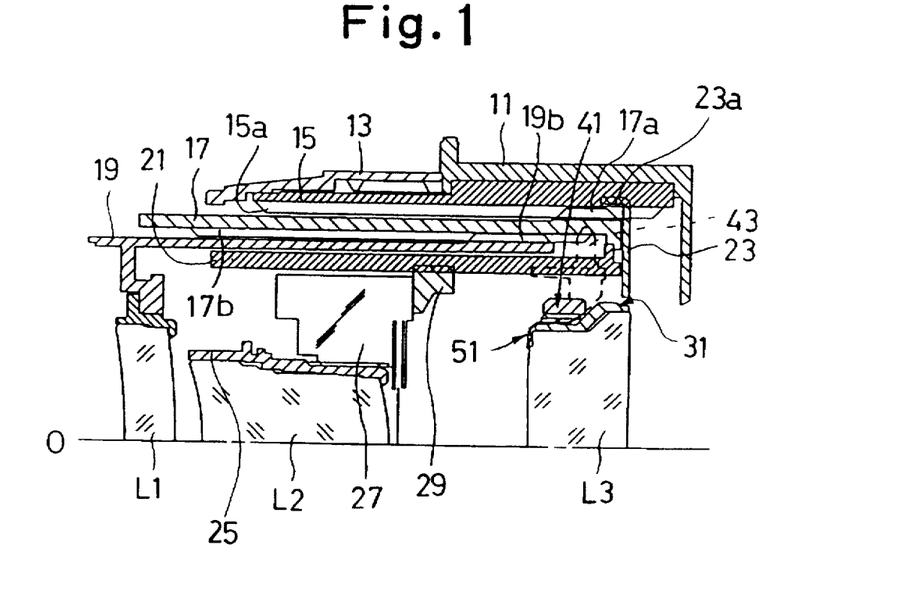
FIG. 1 is a longitudinal sectional view of an upper half of a main part of a lens shutter type camera to which a first embodiment of the present invention is applied.
Figure 2:
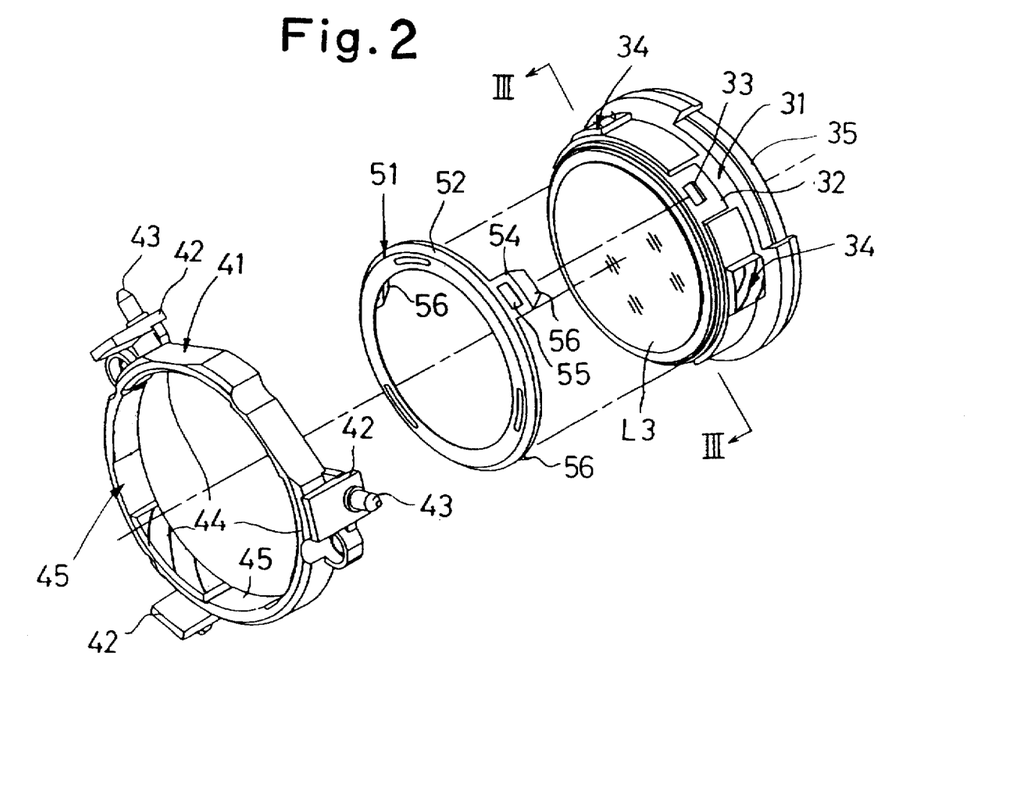
FIG. 2 is an exploded isometric view of a main part of a lens adjusting apparatus according to a first embodiment of the present invention.

FIG. 1 shows a sectional view of an upper half of a lens adjusting apparatus in a lens shutter type camera, taken along an optical axis thereof, according to the present invention. The camera shown in FIG. 1 is a zoom lens camera having three lens groups L1, L2 and L3. In FIGS. 1 and 2, the left and right sides correspond to the front (objective side) and rear (film side) directions of the camera, respectively.

There is an adjusting ring 13 secured to a body frame (stationary structure) 11 on the side thereof adjacent to an object to be photographed to adjust the back focus. A guide ring 15 is fitted in the body frame 11 and the adjusting ring 13 to move in the optical axis direction during the back focus adjustment. A cam ring 17 is provided in the guide ring 15. A first lens barrel 19 is provided within the cam ring 17, and a linearly movable lens barrel 21 is provided within the first lens barrel 19.

The guide ring 15 and the cam ring 17 are associated with each other through helicoids 15a and 17a provided on the inner surface of the guide ring 15 and on the outer surface of the cam ring 17, respectively. The cam ring 17 and the first lens barrel 19 are associated with each other through helicoids 17b and 19b provided on the inner surface of the cam ring 17 and on the outer surface of the first lens barrel 19, respectively. The first lens barrel 19 and the linearly movable lens barrel 21 are associated with each other through a linear guide groove and a guide projection fitted in the guide groove, provided on the inner surface of the first lens barrel 19 and the outer surface of the linearly movable lens barrel 21 so as to move in the optical axis direction without rotating, respectively. The cam ring 17 and the linearly movable lens barrel 21 are associated with each other so as to rotate relatively and move together in the optical axis direction.

The linearly movable lens barrel 21 is provided on the rear end thereof with a guide plate 23 secured thereto which is provided on the front end thereof with a bent portion 23a which is fitted in a linear guide groove (not shown) formed in the guide ring 15 to extend in the optical axis direction. Thus, the linearly movable lens barrel 21 can be moved in the optical axis direction along the linear guide groove, while being restricted by the guide plate 23 and the linear guide groove.

The first lens group L1 is secured to the front end of the first lens barrel 19. The second lens group L2 is provided within the linearly movable lens barrel 21. The second lens group L2 is secured to a second lens frame 25 which is screw-engaged to the annular AF shutter block 27. The AF shutter block 27 is secured to a shutter holding frame 29, so that a plurality of rollers (not shown) provided on the shutter holding frame 29 extend through the linear guide grooves (not shown) formed in the linearly movable lens barrel 21 and the first lens barrel 19 to be engaged in a cam groove (not shown) formed in the cam ring 17. Consequently, when the cam ring 17 is rotated, the second lens frame 25 and the second lens group L2 are moved in the optical axis direction relative to the linearly movable lens barrel 21.

The third lens group L3 is provided within the linearly movable lens barrel 21 behind the second lens group L2. The third lens group L3 is fitted in a third lens frame (inner frame) 31 which is fitted in a third lens frame holding cylinder (outer frame holder) 41. The third lens frame holder 41 is provided on the outer surface thereof with a plurality of guide members 42 which support rollers 43 extending in the radial directions perpendicular to the optical axis O. The guide members 42 are slidably fitted in guide grooves (not shown) formed in the linearly movable barrel 21. The rollers 43 extend through the openings formed in the bottoms of the linear guide grooves of the linearly movable lens barrel 21 and are fitted in the cam groove of the cam ring 17.

Consequently, the third lens frame holder 41, the third lens frame 31, and the third lens group L3 are movable in the optical axis direction along the linear guide grooves of the linearly movable lens barrel 21.

Moreover, a pinion (not shown) is in mesh with a spiral gear (not shown) formed on the outer surface of the cam ring 17. The pinion is connected to a drive shaft of a zoom motor through a gear train. Consequently, when the zoom motor is rotated, the rotation of the cam ring 17 takes place through the pinion and the spiral gear, etc., to effect the zooming.

The zoom lens as constructed above operates as follows upon zooming.

When the cam ring 17 rotates, the cam ring 17 is moved in the optical axis direction while rotating. The rotation and axial movement of the cam ring 17 cause the first lens barrel 19 to move in the optical axis direction without rotating. Consequently, the first lens group L1 is moved in the optical axis direction together with the first lens barrel 19.

The linearly movable lens barrel 21 is moved by the axial movement of the cam ring 17 without rotating in the optical axis direction together with the cam ring 17. Since the cam ring 17 and the linearly movable lens barrel 21 are relatively moved in the optical axis direction, the second lens group L2 and the third lens group L3 are relatively moved in the optical axis direction with the help of the cam groove of the cam ring 17.

The zooming is accomplished by the relative movement of the first, second and third lens groups L1, L2 and L3 away from or close to each other.

The following discussion will be directed to the supporting mechanism of the third lens Group L3 which is one of the most significant components of the present invention.

The lens holding means for holding the third lens group L3 is comprised of the third lens frame 31 which directly holds the third lens Group L3, and the third lens frame holding cylinder 41 which holds the third lens frame 31. The third lens frame 31 is in the form of a circular cylinder which holds therein the third lens group L3. The third lens group L3, held by the third lens frame 31, is elastically pressed against and immovably connected to the third lens frame 31 by an annular lens keeping plate 51, so that no detachment of the annular lens keeping plate 51 occurs.

The third lens frame holding cylinder 41 is provided with three guide members 42 and rollers 43 as mentioned above. The guide members 42 are fitted in the linear guide grooves formed in the linearly movable lens barrel 21. The rollers 43 extend through the linear guide grooves and are fitted in the cam groove formed in the cam ring 17. Namely, the third lens frame holder 41 is guided by the linear guide grooves of the linearly movable lens barrel 21 to move in the optical axis direction, so that when the rotation of the cam ring 17 takes place, the third lens frame holder 41 is moved in the optical axis direction through the cam groove and the rollers 43.

The lens keeping plate 51 is made of an elastically deformable member, such as a metal or synthetic resin. The lens keeping plate 51 is provided with an annular body 52 in the form of a circular disc, and a plurality of tongues 54 that are spaced at a predetermined distance and extend in the optical axis direction from the outer peripheral edge of the annular body 52. The tongues 54 are provided on the center portions thereof with engaging holes 55 in which corresponding engaging pawls 33, provided on the third lens frame 31, can be fitted to secure the lens keeping plate 51 to the third lens frame 31, so that the third lens group L3 can be elastically held by the third lens frame 31. The tongues 54 are provided on the front ends thereof with friction portions 56 which are bent in radial directions away from the optical axis O (i.e., toward the third lens frame holding cylinder 41).

Figure 5:
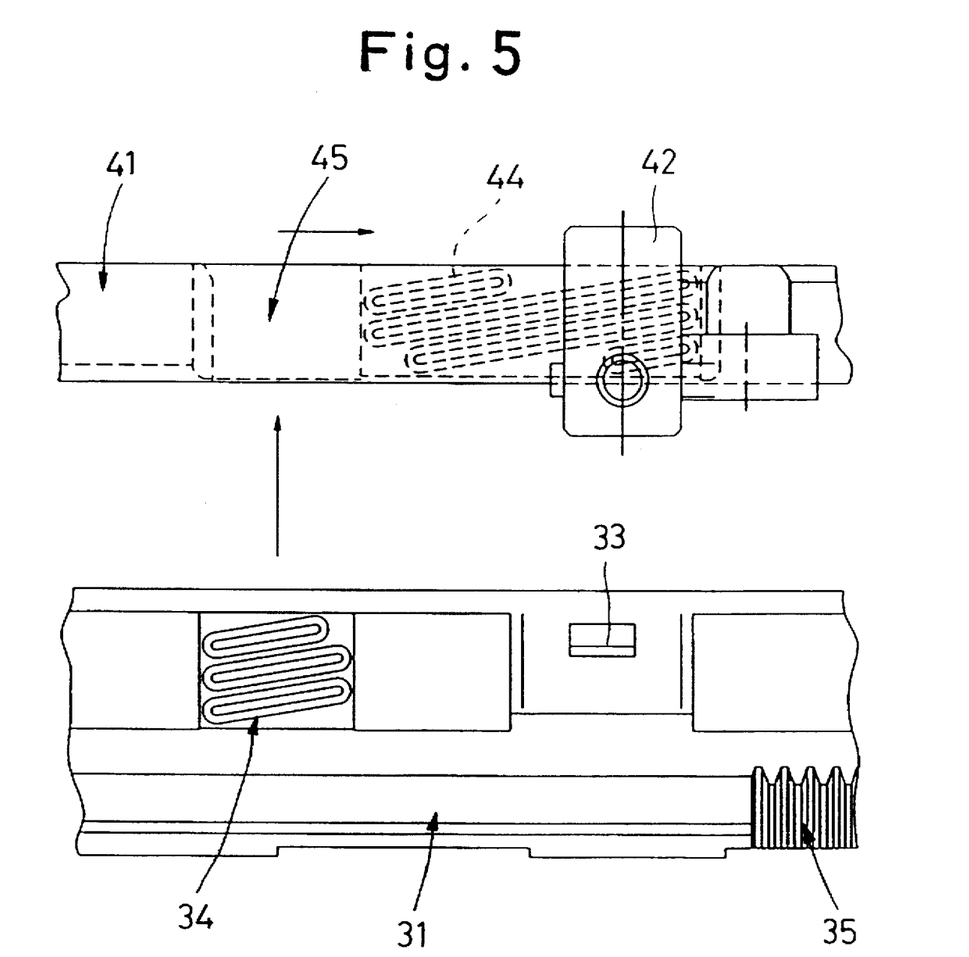
FIG. 5 is a developed plan view of a lens frame and a lens frame holding cylinder to be connected thereto, in the first embodiment.

The third lens frame 31 is provided on the outer peripheral surface thereof with three segmented male helicoid (or screw engaging) portions 34 which are formed by partly cutting away a helicoid formed on the entire periphery of the third lens frame 31 at a substantially equi-angular distance. The identical helicoid (or screw engaging) portions 34 have the same circumferential length (width). The engaging pawls 33 are provided on the cut-away portions of the outer peripheral surface of the third lens frame 31.

The third lens frame holding cylinder 41 is provided on the inner surface thereof with inner projections with three identical segmented female helicoid (or screw engaging) portions 44 corresponding to the outer helicoid (or screw engaging) portions 34 of the third lens frame 31. The inner helicoid (or screw engaging) portions 44 are spaced at a substantially equi-angular distance which match the positions of the three segmented male helicoid portions. The portions of the third lens frame holding cylinder 41 between the adjacent inner helicoid (or screw engaging) portions 44 define recesses 45 in which the outer helicoid (or screw engaging) portions 34 can be inserted in the optical axis direction. Namely, when a relative rotation occurs between the third lens frame 31 and the third lens frame holder 41 when the outer helicoid (or screw engaging) portions 34 are fitted in the corresponding recesses 45 of the third lens frame holder 41, then the outer helicoid (or screw engaging) portions 34 begin engaging with the associated inner helicoid (or screw engaging) portions 44 at one time.

Figure 3:
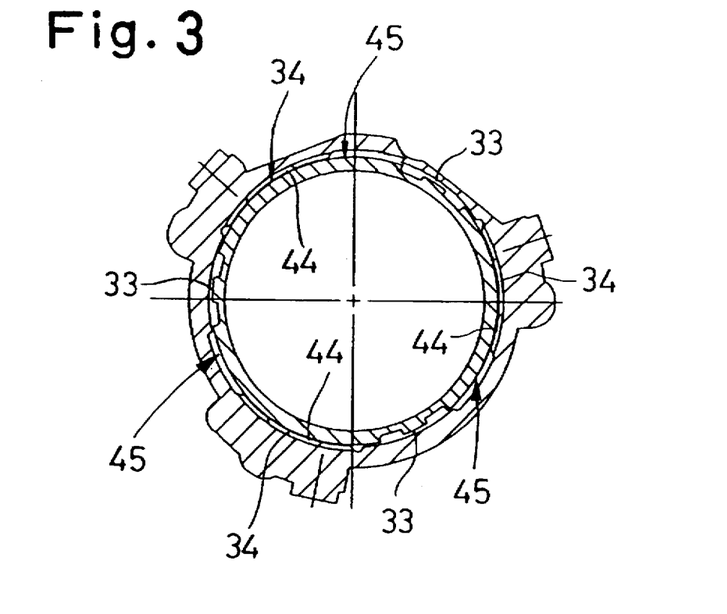
FIG. 3 is a cross sectional view of an assembled lens adjusting apparatus, taken along the line III—III in FIG. 2.

As can be seen from the foregoing, in the first embodiment of the present invention, a slight rotation of the third lens frame 31 relative to the third lens frame holder 41 causes the inner helicoid portions 44 of the third lens frame holder 41 to engage with the outer helicoid portions 34 of the third lens frame 31, so that the third lens frame 31 can be firmly connected to the third lens frame holder 41 without play therebetween. In the illustrated embodiment, the firm connection of the third lens frame 31 to the third lens frame holder 41 can be established by the relative rotation less than 60°. Moreover, in this state referred to as the reference state, the axial lens position can be easily adjusted by the rotation of the third lens frame 31.

Furthermore, the third lens frame 31 is elastically biased and held in the radial direction toward the center portion thereof by the friction members 56 of the lens keeping plate 51. Preferably, the end edges of the helicoid portions 33 and 44 are rounded to ensure a smooth engagement therebetween.

The axial position of the third lens group L3 can be adjusted using an adjusting tool having a pinion 61 (FIG. 4) at the front end thereof after the above-mentioned elements are all assembled or incorporated in a camera. This adjustment is necessary to ensure that for example an image position formed at the telephoto position is coincident with an image position formed at the wide angle position in a zooming lens. This adjustment is made during the assembly of the camera lens. Namely, the front end of the shaft of the pinion 61 is inserted in a bearing 46 provided on the outer peripheral surface of the third lens frame holding cylinder 41 from behind the third lens group L3, so that the pinion 61 is brought in mesh with the gear 35. When the pinion 61 is rotated, the third lens frame 31 is rotated, so that the third lens frame 31 is moved in the axial direction in accordance with the lead threads of the helicoids 34 and 44, while rotating relative to the third lens frame holding cylinder 41. Thus, the axial position of the third lens group L3 is adjusted.

It is possible to provide an engagement means between the helicoid portions 34 and the helicoid portions 44 when the third lens frame 31 is fitted in the third lens frame holder 41 in order to facilitate the screw-engagement of the helicoid portions 34 and 44. This engagement means can be realized, for example, by extending one thread of the helicoid 44 to the guide recesses 45. Alternatively, it is possible to provide the helicoids having lead threads whose direction is opposite to that of the lead threads of the helicoids 34 and 44 in the illustrated embodiment, so that when the third lens frame 31 is rotated in the state that the third lens frame 31 is fitted in the third lens frame holder 41 at the deepest position, the helicoids begin engaging and hence, the third lens frame 31 is moved in a direction in which the third lens frame 31 is gradually disengaged from the third lens frame holder 41.

Figure 6:
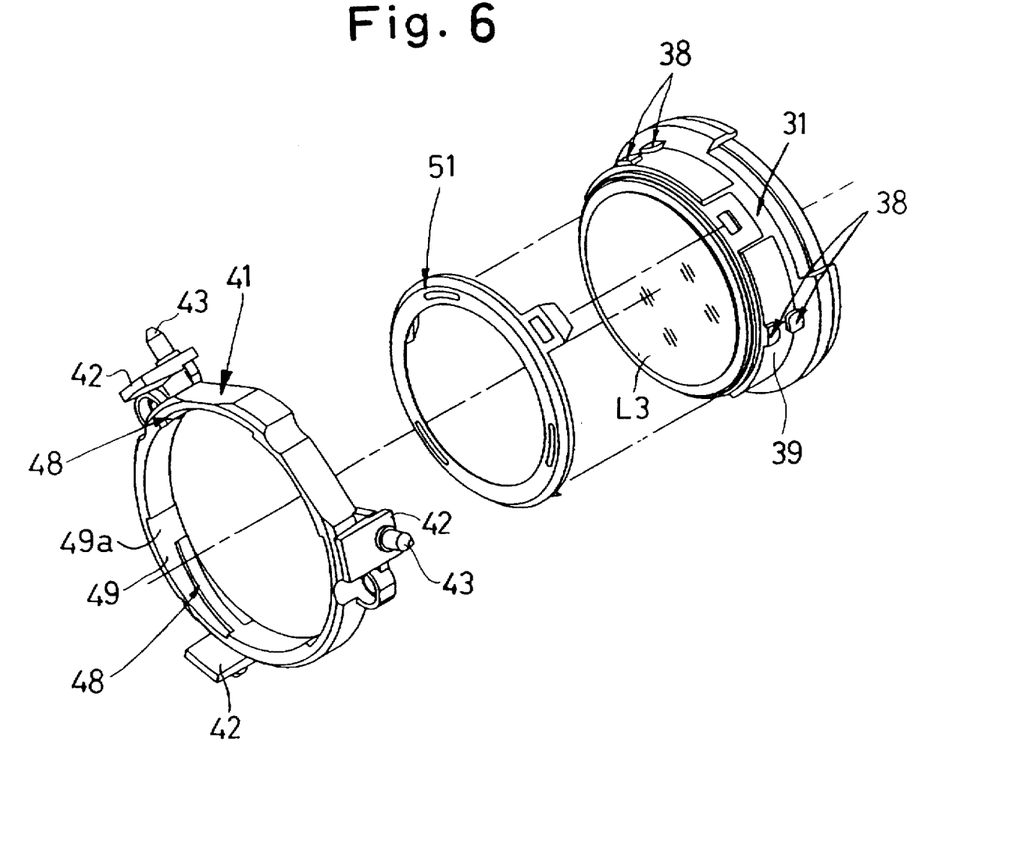
FIG. 6 is an exploded isometric view of a main part of a lens adjusting apparatus according to a second embodiment of the present invention.
Figure 7:
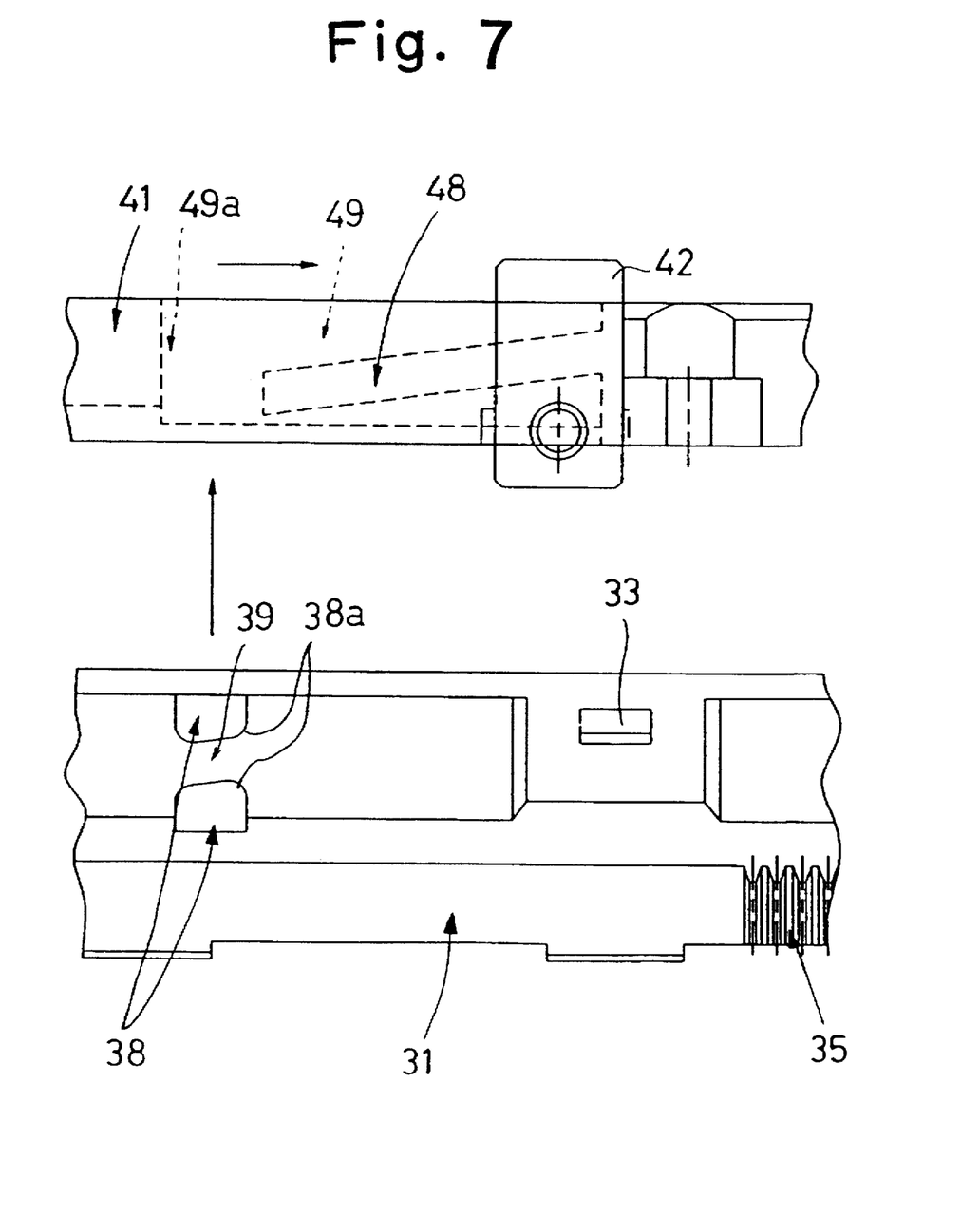
FIG. 7 is a developed plan view of a lens frame and a lens frame holding cylinder to be connected thereto, in the second embodiment shown in FIG. 6.

A second embodiment of the present invention will be discussed below with reference to FIGS. 6 and 7.

The elements corresponding to those shown in FIGS. 1 to 5 are designated with identical numerals and no explanation thereof will be given herein.

In the second embodiment, the split helicoids 34 and 44 in the first embodiment are replaced with three projections 48 in the form of a spiral thread and a pair of projections 38 that define therebetween a groove 39 in which the associated projection 48 can be fitted and travel.

Three pairs of projections 38 are provided on the outer peripheral surface of the third lens frame 31 at an equi-angular distance defining the positions of the three projections 48. The grooves 39 defined between the projections 38 substantially constitute a thread which can be screw-engaged by the projections 48. Other structures of the third lens frame 31 in FIGS. 6 and 7 are the same as the third lens frame 31, including the gear 35, shown in FIG. 1.

The three projections 48 are provided on the inner peripheral surface of the third lens frame holding cylinder 41 at an equi-angular distance. The upper surfaces of the projections 48 are flush with the inner peripheral surface of the third lens frame holder 41. In other words, there are recesses 49 on the inner peripheral surface portion of the third lens frame holder 41 in order to provide relief for the projections 48. The entire length of the projections 48 is longer than the entire length of the pairs of projections 38 to ensure a certain engagement therebetween and an easy adjustment of the lens position. The recesses 49 are provided with guide recesses 49a between the projections 49, so that the roller portions 38 can be disengagably inserted into the guide recesses 49a in the optical axis direction. The end edges of the pairs of projections 38 (inserting ends of the grooves 39) are rounded as indicated by 38a in FIG. 7 to facilitate the insertion of the projections 48 in the pairs of projections 38.

The third lens frame 31 in the second embodiment is attached to the third lens frame holding cylinder 41 as follows. The third lens group L3 is secured to the third lens frame 31 by the lens keeping plate 51.

The third lens frame 31 is fitted in the third lens frame holder 41 from behind, so that the pairs of projections 38 are fitted in the corresponding recesses 49a. Thereafter, the third lens frame 31 or the third lens frame holder 41 is rotated in a direction to move the projections 48 into the corresponding grooves 39. As a result of the rotation of the third lens frame 31 or the third lens frame holder 41, the three pairs of projections 48 and grooves 39 come into engagement with each other at one time, so that the third lens frame 31 can be firmly held by the third lens frame holder 41 without play or inclination therebetween.

As can be understood from the above discussion, in the second embodiment of the invention, since the third lens frame 31 and the third lens frame holder 41 are connected by the engagement of the three pairs of projections 48 and the three grooves 39, a slight rotation of the third lens frame 31 causes the third lens frame 31 to firmly engage with the third lens frame holder 41. In the illustrated embodiment, the firm connection between the third lens frame 31 and the third lens frame holding cylinder 41 can be established by the relative rotation of about only 60° at the reference position. In this state, the axial position of the lens group can be adjusted by rotating the third lens frame 31 relative to the third lens frame holder 41 in a predetermined direction.

The adjustment of the lens position is accomplished as follows.

Figure 4:
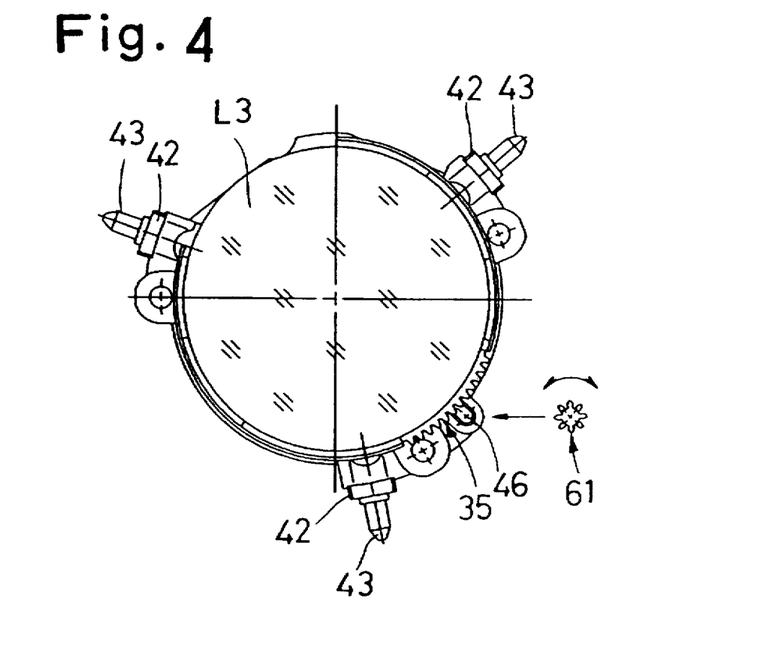
FIG. 4 is a rear end view of an assembled lens adjusting apparatus shown in FIG. 2.

The third lens frame 31 is attached to the third lens frame holder 41 which is then attached to a camera, similar to the first embodiment shown in FIG. 4. Thereafter, the third lens frame 31 is rotated and moved in the optical axis direction to effect the adjustment of the axial position thereof, by the same operations as those in the first embodiment discussed above with reference to FIG. 4.

Although the connecting means between the third lens frame and the third lens frame holder is comprised of the helicoids 34 and 44 or a combination of the projections 48 and the grooves 39 in the illustrated embodiments, the present invention is not limited thereto. Any disengagable connecting means which can be linearly moved by the rotation thereof can be used.

Although the pairs of projections 38 are provided on the third lens frame 31 and the corresponding projections are provided on the third lens frame holder 41 in the second embodiment, it is possible to provide the pairs of projections 38 and the projections 48 on the third lens frame holder 41 and the third lens frame 31, respectively.

Moreover, although the helicoids 34 and 44 or the rollers 38 and the projections 48 are provided in the same plane in the axial direction in the illustrated embodiments, it is possible to provide a plurality of pairs of helicoids 34 and 44 or the rollers 38 and the projections 48 in different axial positions (axial extremities of the lens barrel or intermediate positions thereof, etc.) particularly when the lens barrel has a long axial length. Moreover, the number of the split helicoids 34 and 44 or the pairs of projections 38 and the projections 48 is not limited to a specific value.

Although the illustrated embodiments are directed to a lens holding means for holding the third lens group L3 which is moved during the zooming, the present invention can be equally applied, for example, to a lens holding mechanism for holding a stationary lens group or a connecting mechanism which connects two lens barrels.

As can be understood from the above discussion, according to the present invention, since the screw connection between a lens frame and a lens frame holder is established by a plurality of split connecting portions, and the lens frame is firmly connected to the lens frame holder by relatively rotating the lens frame while engaging the latter with the lens frame holder, more than one connecting portion is established therebetween by a slight relative rotation of the lens frame, thus resulting in a reliable and easy connection between the lens frame and the lens frame holder.

I claim:

1. An apparatus for adjusting an axial position of a lens, comprising:

a cylindrical lens frame which holds said lens;

a cylindrical lens frame holder which holds said lens frame; and connecting means including a plurality of segments of screw engaging portions provided on each of said lens frame and said lens frame holder, said segments of screw engaging portions of said lens frame extending outwardly in a radial direction and being separated from each other in a circumferential direction and said segments of screw engaging portions of said lens frame holder extending inwardly in a radial direction and being separated from each other in a circumferential direction by a recess, wherein said lens frame and said lens frame holder are initially engaged by inserting said segments of screw engaging portions of said lens frame into said recess, in an optical axis direction, and, after initial engagement, said screw engaging portions of said lens frame and said screw engaging portions of said lens frame holder are engaged by relative rotation between said lens frame and said lens frame holder.

2. An adjusting apparatus according to claim 1, wherein said screw engaging portions are comprised of a segment of a plurality of helicoids.

3. An adjusting apparatus according to claim 2, wherein said plurality of helicoids are comprised of male and female helicoids which are each spaced at a predetermined distance so that said lens frame and said lens frame holder can be initially fitted together without rotating.

4. An adjusting apparatus according to claim 3, wherein said male and female helicoids screw engage with each other after said lens frame and said lens frame holder are initially fitted together by a relative rotation between said lens frame and said lens frame holder.

5. An adjusting apparatus according to claim 1, wherein said screw engaging portions comprise a plurality of projections with a predetermined lead thread provided on one of said lens frame and said lens frame holder and a plurality of corresponding grooves provided on the other one of said lens frame holder and said lens frame.

6. An adjusting apparatus according to claim 5, wherein said plurality of projections is fitted in corresponding grooves when there is a relative rotation between said lens frame and said lens frame holder in said fitted state.

7. An adjusting apparatus according to claim 1, further comprising a lens keeping member between said lens frame and said lens frame holder to press said lens against said lens frame.

8. The apparatus for adjusting an axial position of a lens according to claim 1, further comprising:

a leading portion extending, in the optical axis direction, from said screw engaging portions of each of said lens frame and said lens frame holder; and an intermediate portion positioned behind said leading portion of one of said lens frame and said lens frame holder;

wherein said relative rotation occurs when said leading portion of the other of said lens frame and lens frame holder is positioned to engage said intermediate portion of said one of said lens frame and lens frame holder.

9. The apparatus for adjusting an axial position of a lens according to claim 1, wherein said relative rotation engages said lens frame and said lens frame holder to move together.

10. The apparatus for adjusting an axial position of a lens according to claim 1, said lens frame holder further comprising at least one outwardly extending projection engagable with a cam groove of a cam ring.

11. The apparatus for adjusting an axial position of a lens according to claim 1, said lens frame and said lens frame holder being movable together along the optical axis direction by engagement with a cam ring.

12. The apparatus for adjusting an axial position of a lens according to claim 1, said relative rotation being less than approximately 60°.

13. The apparatus for adjusting an axial position of a lens according to claim 1, said segments of screw engaging portions of said lens frame holder comprising female helicoid portions, and said segments of screw engaging portions of said lens frame comprising male helicoid portions.

* * * * *

UNITED STATES PATENT AND TRADEMARK OFFICE
CERTIFICATE OF CORRECTION

PATENT NO. : 5,510,936
DATED : April 23, 1996
INVENTOR(S) : N. AOKI et al.

It is certified that error appears in the above-indentified patent and that said Letters Patent is hereby corrected as shown below:

On the cover, in section [56], "References Cited", "U.S. PATENT DOCUMENTS", insert ---5,365,373  11/1994  TANAKA  359/ 698

Signed and Sealed this

Tenth Day of December, 1996

Attest:

BRUCE LEHMAN

Attesting Officer     Commissioner of Patents and Trademarks